United States Patent
Takagi

(10) Patent No.: US 8,804,203 B2
(45) Date of Patent: Aug. 12, 2014

(54) CODED IMAGE PROCESSING SYSTEM AND METHOD FOR CONTROLLING THE SAME

(75) Inventor: Noriko Takagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 147 days.

(21) Appl. No.: 13/416,330

(22) Filed: Mar. 9, 2012

(65) Prior Publication Data
US 2012/0229867 A1 Sep. 13, 2012

(30) Foreign Application Priority Data
Mar. 11, 2011 (JP) ................... 2011-054465

(51) Int. Cl.
*H04N 1/40* (2006.01)
*G06K 15/02* (2006.01)
*H04N 1/32* (2006.01)
*H04N 1/44* (2006.01)

(52) U.S. Cl.
CPC ............ *G06K 15/02* (2013.01); *H04N 1/32133* (2013.01); *H04N 2201/3269* (2013.01); *H04N 1/4413* (2013.01); *H04N 1/32325* (2013.01); *H04N 2201/3271* (2013.01); *G60F 21/608* (2013.01)
USPC ............................ 358/3.28; 358/2.1; 358/468

(58) Field of Classification Search
USPC ......... 358/3.28, 1.9, 2.1, 1.15, 442, 444, 468, 358/400, 500
See application file for complete search history.

(56) References Cited

U.S. PATENT DOCUMENTS

| 6,781,710 | B1 * | 8/2004 | Simpson et al. | 358/1.15 |
| 7,889,363 | B2 * | 2/2011 | Wallin | 358/1.13 |
| 7,898,697 | B2 * | 3/2011 | Tanaka | 358/3.28 |
| 8,305,647 | B2 * | 11/2012 | Maeno | 358/3.28 |
| 8,347,379 | B2 * | 1/2013 | Tsuzuki | 726/21 |
| 2004/0190042 | A1 * | 9/2004 | Ferlitsch et al. | 358/1.15 |

FOREIGN PATENT DOCUMENTS

JP     2010-202118 A     9/2010

* cited by examiner

Primary Examiner — Thomas D Lee
Assistant Examiner — Stephen M Brinich
(74) *Attorney, Agent, or Firm* — Canon U.S.A., Inc. IP Division

(57) ABSTRACT

A system capable of processing an coded image stores first information including information indicating output time when an image has been output from an output apparatus and information indicating a user who has instructed the output apparatus to output the image in association with second information including information indicating an original output apparatus has output a source image of the image, information indicating output time when the source image has been output from the output apparatus, and information indicating a user who has instructed the original output apparatus to output the source image. The system searches for a coded image to acquire first information, and then displays the second information.

3 Claims, 21 Drawing Sheets

FIG.7

| Original USER INFORMATION | Suzuki |
|---|---|
| Latest USER INFORMATION | — |
| DATE AND TIME INFORMATION | 2008/1/30 9:53:13 |
| COPY NUMBER | 1 |
| PAGE NUMBER | 2 |
| DEVICE INFORMATION | MFP-0001 |

FIG.8A

| Original USER INFORMATION | Suzuki |
|---|---|
| Latest USER INFORMATION | Tanaka |
| DATE AND TIME INFORMATION | 2008/9/21 14:33:50 |
| COPY NUMBER | 2 |
| PAGE NUMBER | 1 |
| DEVICE INFORMATION | MFP-0002 |

FIG.8B

| | Original | Latest |
|---|---|---|
| USER INFORMATION | Suzuki | Tanaka |
| DATE AND TIME INFORMATION | 2008/1/30 9:53:13 | 2008/9/21 14:33:50 |
| COPY NUMBER | 1 | 2 |
| PAGE NUMBER | 2 | 1 |
| DEVICE INFORMATION | MFP-0001 | MFP-0002 |

FIG.8C

| Original USER INFORMATION | Tanaka |
|---|---|
| Latest USER INFORMATION | — |
| DATE AND TIME INFORMATION | 2008/9/21 14:33:50 |
| COPY NUMBER | 2 |
| PAGE NUMBER | 1 |
| DEVICE INFORMATION | MFP-0002 |

FIG.10A

| DOCUMENT ID | PAGE ID | INPUT TRACE INFORMATION ||||||| OUTPUT TRACE INFORMATION |||||
|---|---|---|---|---|---|---|---|---|---|---|
| | | INPUT USER INFORMATION | INPUT DATE AND TIME INFORMATION | INPUT COPY NUMBER | INPUT PAGE NUMBER | INPUT DEVICE INFORMATION | OUTPUT USER INFORMATION | OUTPUT DATE AND TIME INFORMATION | OUTPUT COPY NUMBER | OUTPUT PAGE NUMBER | OUTPUT DEVICE INFORMATION |
| 100 | 001 | — | — | — | — | — | Suzuki | 2008/1/30 9:53:13 | 1 | 1 | MFP-0001 |
| | 002 | — | — | — | — | — | Suzuki | 2008/1/30 9:53:13 | 1 | 2 | MFP-0001 |

FIG.10B

| DOCUMENT ID | PAGE ID | INPUT TRACE INFORMATION ||||||| OUTPUT TRACE INFORMATION |||||
|---|---|---|---|---|---|---|---|---|---|---|
| | | INPUT USER INFORMATION | INPUT DATE AND TIME INFORMATION | INPUT COPY NUMBER | INPUT PAGE NUMBER | INPUT DEVICE INFORMATION | OUTPUT USER INFORMATION | OUTPUT DATE AND TIME INFORMATION | OUTPUT COPY NUMBER | OUTPUT PAGE NUMBER | OUTPUT DEVICE INFORMATION |
| 101 | 010 | Suzuki | 2008/1/30 9:53:13 | 1 | 1 | MFP-0001 | Tanaka | 2008/9/21 14:33:50 | 2 | 1 | MFP-0002 |
| | 011 | Suzuki | 2008/1/30 9:53:13 | 1 | 2 | MFP-0001 | Tanaka | 2008/9/21 14:33:50 | 2 | 2 | MFP-0002 |

FIG.10C

| DOCUMENT ID | PAGE ID | INPUT TRACE INFORMATION ||||||  OUTPUT TRACE INFORMATION |||||
|---|---|---|---|---|---|---|---|---|---|---|---|
| | | INPUT USER INFORMATION | INPUT DATE AND TIME INFORMATION | INPUT COPY NUMBER | INPUT PAGE NUMBER | INPUT DEVICE INFORMATION | OUTPUT USER INFORMATION | OUTPUT DATE AND TIME INFORMATION | OUTPUT COPY NUMBER | OUTPUT PAGE NUMBER | OUTPUT DEVICE INFORMATION |
| 102 | 005 | - | - | - | - | - | Tanaka | 2010/1/10 13:45:34 | 2 | 1 | MFP-0003 |

FIG.10D

| DOCUMENT ID | PAGE ID | INPUT TRACE INFORMATION ||||| OUTPUT TRACE INFORMATION |||||
|---|---|---|---|---|---|---|---|---|---|---|---|
| | | INPUT USER INFORMATION | INPUT DATE AND TIME INFORMATION | INPUT COPY NUMBER | INPUT PAGE NUMBER | INPUT DEVICE INFORMATION | OUTPUT USER INFORMATION | OUTPUT DATE AND TIME INFORMATION | OUTPUT COPY NUMBER | OUTPUT PAGE NUMBER | OUTPUT DEVICE INFORMATION |
| 103 | 006 | Tanaka | 2008/9/21 14:33:50 | 2 | 1 | MFP-0002 | Yamada | 2010/8/8 11:24:20 | 1 | 1 | MFP-0003 |
| 103 | 007 | Tanaka | 2008/9/21 14:33:50 | 2 | 2 | MFP-0002 | Yamada | 2010/8/8 11:24:20 | 1 | 2 | MFP-0003 |
| 103 | 008 | Tanaka | 2010/1/10 13:45:34 | 2 | 1 | MFP-0003 | Yamada | 2010/8/8 11:24:20 | 1 | 3 | MFP-0003 |

FIG.11

| | DOCUMENT ID 1101 | PAGE ID 1102 | INPUT USER INFORMATION 1103 | INPUT DATE AND TIME INFORMATION 1104 | INPUT COPY NUMBER 1105 | INPUT PAGE NUMBER 1106 | INPUT DEVICE INFORMATION 1107 | OUTPUT USER INFORMATION 1108 | OUTPUT DATE AND TIME INFORMATION 1109 | OUTPUT COPY NUMBER 1110 | OUTPUT PAGE NUMBER 1111 | OUTPUT DEVICE INFORMATION 1112 |
|---|---|---|---|---|---|---|---|---|---|---|---|---|
| DATA 1 | 100 | 001 | – | – | – | – | – | Suzuki | 2008/1/30 9:53:13 | 1 | 1 | MFP-0001 |
| DATA 2 | 100 | 002 | – | – | – | – | – | Suzuki | 2008/1/30 9:53:13 | 1 | 2 | MFP-0001 |
| DATA 3 | 101 | 010 | Suzuki | 2008/1/30 9:53:13 | 1 | 1 | MFP-0001 | Tanaka | 2008/9/21 14:33:50 | 2 | 1 | MFP-0002 |
| DATA 4 | 101 | 011 | Suzuki | 2008/1/30 9:53:13 | 1 | 2 | MFP-0001 | Tanaka | 2008/9/21 14:33:50 | 2 | 2 | MFP-0002 |
| DATA 5 | 102 | 005 | – | – | – | – | – | Tanaka | 2010/1/10 13:45:34 | 2 | 1 | MFP-0002 |
| DATA 6 | 103 | 006 | Tanaka | 2008/9/21 14:33:50 | 2 | 1 | MFP-0002 | Yamada | 2010/8/8 11:24:20 | 1 | 1 | MFP-0003 |
| DATA 7 | 103 | 007 | Tanaka | 2008/9/21 14:33:50 | 2 | 2 | MFP-0002 | Yamada | 2010/8/8 11:24:20 | 1 | 2 | MFP-0003 |
| DATA 8 | 103 | 008 | Tanaka | 2010/1/10 13:45:34 | 2 | 1 | MFP-0003 | Yamada | 2010/8/8 11:24:20 | 1 | 3 | MFP-0003 |

FIG.14A

| | TRACE TARGET | OUTPUT TRACE INFORMATION ||||
| | | OUTPUT USER INFORMATION | OUTPUT DATE AND TIME INFORMATION | OUTPUT COPY NUMBER | OUTPUT PAGE NUMBER | OUTPUT DEVICE INFORMATION |
|---|---|---|---|---|---|---|
| LIST 1 | 1 | Yamada | 2010/8/8 11:24:20 | 1 | 2 | MFP-0003 |
| LIST 2 | 0 | Yamada | 2010/8/8 11:24:20 | 1 | 1 | MFP-0003 |
| LIST 3 | 0 | Yamada | 2010/8/8 11:24:20 | 1 | 3 | MFP-0003 |

FIG.14B

| | TRACE RESULT 1 |||||| TRACE RESULT 2 |||||| TRACE RESULT 3 ||||||
| | OUTPUT USER INFORMATION | OUTPUT DATE AND TIME INFORMATION | OUTPUT COPY NUMBER | OUTPUT PAGE NUMBER | OUTPUT DEVICE INFORMATION | OUTPUT USER INFORMATION | OUTPUT DATE AND TIME INFORMATION | OUTPUT COPY NUMBER | OUTPUT PAGE NUMBER | OUTPUT DEVICE INFORMATION | OUTPUT USER INFORMATION | OUTPUT DATE AND TIME INFORMATION | OUTPUT COPY NUMBER | OUTPUT PAGE NUMBER | OUTPUT DEVICE INFORMATION |
|---|---|---|---|---|---|---|---|---|---|---|---|---|---|---|---|
| LIST 1 | Yamada | 2010/8/8 11:24:20 | 1 | 2 | MFP-0003 | Tanaka | 2008/9/21 14:33:50 | 2 | 2 | MFP-0002 | Suzuki | 2008/1/30 9:53:13 | 1 | 2 | MFP-0001 |
| LIST 2 | Yamada | 2010/8/8 11:24:20 | 1 | 1 | MFP-0003 | Tanaka | 2008/9/21 14:33:50 | 2 | 1 | MFP-0002 | Suzuki | 2008/1/30 9:53:13 | 1 | 1 | MFP-0001 |
| LIST 3 | Yamada | 2010/8/8 11:24:20 | 1 | 3 | MFP-0003 | Tanaka | 2010/1/10 13:45:34 | 2 | 1 | MFP-0003 | | | | | |

FIG.16

```
TRACE RESULT
⊟ DOCUMENT D (Yamada, 2010/8/8 11:24, MFP-0003, COPY NUMBER 1, THREE PAGES IN ALL)
  └⊞ DOCUMENT B (Tanaka, 2008/9/21 14:33, MFP-0002, COPY NUMBER 2, TWO PAGES IN ALL)
     └── DOCUMENT A (Suzuki, 2008/1/30 9:53, MFP-0001, COPY NUMBER 1, TWO PAGES IN ALL)
  ┆--- DOCUMENT C (Tanaka, 2010/1/10 13:4, MFP-0003, COPY NUMBER 2, ONE PAGE IN ALL)

| TERMINOLOGY | MEANING |
|---|---|
| MFP | MULTIFUNCTION PERIPHERAL OPERABLE AS IMAGE FORMING APPARATUS HAVING SCAN, COPY, PRINT, AND SEND FUNCTIONS. |
| DOCUMENT | PRINTED PRODUCT OR COPIED PRODUCT ON WHICH SPECIFIC INFORMATION (E.G., TEXT AND GRAPHICS) IS PRINTED. |
| ORIGINAL DOCUMENT | ORIGINAL DOCUMENT TO BE COPIED. PAPER TO BE SCANNED IN COPYING OPERATION. |
| COPY DOCUMENT | DOCUMENT OUTPUT THROUGH COPY PROCESSING. PRINTED PAPER RESULTING FROM COPYING OPERATION. |
| PRINT | PRINT OPERATION USING PRINTER DRIVER INSTALLED ON PC. |
| COPY | COPY OPERATION. |
| CONTENT | SPECIFIC INFORMATION INCLUDING TEXT AND GRAPHICS TO BE PRINTED ON PAPER IN PRINT OR COPY OPERATION (E.G., INFORMATION TO BE INTEGRATED WITH QR CODE). |
| PAGE | CONTENT TO BE PRINTED ON ONE DOCUMENT SURFACE. |
| BOOKLET | ASSEMBLY OF A PLURALITY OF PAGES. |
| EMBEDDING INFORMATION | SPECIFIC INFORMATION RELATING TO DOCUMENT MANAGEMENT AND COPY RESTRICTION TO BE ADDED TO CODED IMAGE (E.G., QR CODE, ONE-DIMENSIONAL CODE, OR ELECTRONIC WATERMARK) |
| Original INFORMATION | INFORMATION AT TIME WHEN CONTENT IS FIRST OUTPUT. |
| Original DEVICE INFORMATION | INFORMATION IDENTIFYING MFP AT TIME WHEN CONTENT IS FIRST OUTPUT. |
| Original DATE AND TIME INFORMATION | DATE AND TIME INFORMATION AT TIME WHEN CONTENT IS FIRST OUTPUT. |
| Original USER INFORMATION | USER INFORMATION AT TIME WHEN CONTENT IS FIRST OUTPUT. |
| Latest INFORMATION | INFORMATION AT TIME WHEN LATEST DOCUMENT IS OUTPUT. |
| Latest DEVICE INFORMATION | INFORMATION IDENTIFYING MFP AT TIME WHEN LATEST DOCUMENT IS OUTPUT. |
| Latest DATE AND TIME INFORMATION | DATE AND TIME INFORMATION AT TIME WHEN LATEST DOCUMENT IS OUTPUT. |
| Latest USER INFORMATION | USER INFORMATION AT TIME WHEN LATEST DOCUMENT IS OUTPUT. |
| PAGE NUMBER | SERIAL NUMBER ALLOCATED TO PAGE. |
| COPY NUMBER | SERIAL NUMBER ALLOCATED TO A GROUP OF A PLURALITY OF COPIES OF DOCUMENT. |
| TRACE INFORMATION | TRACE INFORMATION TO BE RECORDED AND MANAGED BY SERVER, INCLUDING INPUT TRACE INFORMATION AND OUTPUT TRACE INFORMATION RECORDED BY MFP WHEN PRINT OR COPY OPERATION IS PERFORMED. |
| DOCUMENT TRACE INFORMATION | INFORMATION ASSOCIATING DOCUMENT ID TO BE RECORDED IN LOG WITH TRACE INFORMATION OF EACH PAGE. |
| DOCUMENT ID | ID ALLOCATED TO EACH DOCUMENT. ID HAVING UNIQUE VALUE, AT LEAST, IN LOG. |

FIG.18

| | |
|---|---|
| PAGE TRACE INFORMATION | INFORMATION ASSOCIATING PAGE ID TO BE RECORDED IN LOG WITH INPUT TRACE INFORMATION AND OUTPUT TRACE INFORMATION. INFORMATION MANAGED ON PAGE-BY-PAGE BASIS. |
| PAGE ID | ID ALLOCATED TO EACH PAGE. ID HAVING UNIQUE VALUE, AT LEAST, IN LOG. |
| INPUT TRACE INFORMATION | Latest TRACE INFORMATION, WHICH IS ACQUIRED FROM QR CODE AND DECODED. |
| INPUT DEVICE INFORMATION | Latest DEVICE INFORMATION, WHICH IS ACQUIRED FROM QR CODE AND DECODED. |
| INPUT DATE AND TIME INFORMATION | Latest DATE AND TIME INFORMATION, WHICH IS ACQUIRED FROM QR CODE AND DECODED. |
| INPUT USER INFORMATION | Latest USER INFORMATION, WHICH IS ACQUIRED FROM QR CODE AND DECODED. |
| OUTPUT TRACE INFORMATION | Latest TRACE INFORMATION REQUIRED TO ENCODE AND GENERATE EMBEDDING INFORMATION. |
| OUTPUT DEVICE INFORMATION | Latest DEVICE INFORMATION REQUIRED TO ENCODE AND GENERATE EMBEDDING INFORMATION. |
| OUTPUT DATE AND TIME INFORMATION | Latest DATE AND TIME INFORMATION REQUIRED TO ENCODE AND GENERATE EMBEDDING INFORMATION. |
| OUTPUT USER INFORMATION | Latest USER INFORMATION REQUIRED TO ENCODE AND GENERATE EMBEDDING INFORMATION. |
| OUTPUT COPY NUMBER | COPY NUMBER INFORMATION REQUIRED TO ENCODE AND GENERATE EMBEDDING INFORMATION. |
| OUTPUT PAGE NUMBER | PAGE INFORMATION REQUIRED TO ENCODE AND GENERATE EMBEDDING INFORMATION. |
| SEARCH INFORMATION | INFORMATION REQUIRED TO SEARCH FOR TRACE INFORMATION. MORE SPECIFICALLY, A SET OF "Latest INFORMATION", "COPY NUMBER", AND "PAGE NUMBER", OF EMBEDDING INFORMATION OBTAINED BY DECODING QR CODE OF SCAN IMAGE. |
| COMPLETE COINCIDENT SEARCH INFORMATION LIST | INFORMATION FOR A PLURALITY OF PIECES OF SEARCH INFORMATION, WHICH IS ACTUALLY A SEARCH INFORMATION LIST. TRACING A DOCUMENT INCLUDING ALL INFORMATION INCLUDED IN THE LIST IS INTENDED. |
| SEARCH CONDITION | OUTPUT TRACE INFORMATION REQUIRED TO PERFORM DATA TABLE SEARCH. SEARCH CONDITION IS UPDATED BASED ON INPUT TRACE INFORMATION ACQUIRED FROM DATA OBTAINED AS SEARCH RESULT OF OUTPUT TRACE INFORMATION. DATA TABLE SEARCH OF OUTPUT TRACE INFORMATION IS PERFORMED AGAIN BASED ON UPDATED SEARCH CONDITION. |

FIG.19

[CONTENT OF EMBEDDING INFORMATION]

| EMBEDDING INFORMATION | Original INFORMATION | Original DEVICE INFORMATION |
|---|---|---|
| | | Original DATE AND TIME INFORMATION |
| | | Original USER INFORMATION |
| | Latest INFORMATION | Latest DEVICE INFORMATION |
| | | Latest DATE AND TIME INFORMATION |
| | | Latest USER INFORMATION |
| | COPY NUMBER ||
| | PAGE NUMBER ||

FIG.20

[CONTENT OF TRACE INFORMATION]

| DOCUMENT TRACE INFORMATION | PAGE TRACE INFORMATION | DOCUMENT ID | |
|---|---|---|---|
| | | PAGE ID | |
| | | INPUT TRACE INFORMATION | INPUT DEVICE INFORMATION |
| | | | INPUT DATE AND TIME INFORMATION |
| | | | INPUT USER INFORMATION |
| | | | INPUT COPY NUMBER |
| | | | INPUT PAGE NUMBER |
| | | OUTPUT TRACE INFORMATION | OUTPUT DEVICE INFORMATION |
| | | | OUTPUT DATE AND TIME INFORMATION |
| | | | OUTPUT USER INFORMATION |
| | | | OUTPUT COPY NUMBER |
| | | | OUTPUT PAGE NUMBER |
| | PAGE TRACE INFORMATION | PAGE ID | |
| | | INPUT TRACE INFORMATION | INPUT DEVICE INFORMATION |
| | | | INPUT DATE AND TIME INFORMATION |
| | | | INPUT USER INFORMATION |
| | | | INPUT COPY NUMBER |
| | | | INPUT PAGE NUMBER |
| | | OUTPUT TRACE INFORMATION | OUTPUT DEVICE INFORMATION |
| | | | OUTPUT DATE AND TIME INFORMATION |
| | | | OUTPUT USER INFORMATION |
| | | | OUTPUT COPY NUMBER |
| | | | OUTPUT PAGE NUMBER |

CODED IMAGE PROCESSING SYSTEM AND METHOD FOR CONTROLLING THE SAME

BACKGROUND OF THE INVENTION

1. Field of the Invention

The present invention relates to a system that can trace an operation history of a document including a coded image attached thereto, and relates to a method for controlling the system.

2. Description of the Related Art

A technique capable of printing ID information on a printed product to identify each printed product is discussed in Japanese Patent Application No. 2010-202118 (i.e., a patent literature having not yet been published on the filing date of the present patent application). According to the technique discussed in Japanese Patent Application No. 2010-202118, a set of printed products cannot be identified, although each printed product is identifiable.

SUMMARY OF THE INVENTION

According to an aspect of the present invention, a coded image processing system includes a storing unit configured to store first information and second information while associating them with each other, in which the first information includes information indicating an output apparatus of an image, information indicating output time of the image having been output from the output apparatus, and information indicating a user who has instructed the output apparatus to output the image, and the second information includes information indicating an original output apparatus that has output a source image of the image, information indicating output time when the source image has been output from the original output apparatus, and information indicating a user who has instructed the original output apparatus to output the source image. The system further includes an acquisition unit configured to acquire information indicating the output apparatus of the image and information indicating the output time of the image having been output from the output apparatus, from a coded image included in the image; a search unit configured to search the storing unit to find first information that includes information identical to the information indicating the output apparatus and the information indicating the output time of the image having been output from the output apparatus, which are acquired by the acquisition unit; and a display unit configured to display information indicating the user who has instructed the original output apparatus to output the source image, of the second information stored in the storing unit in association with the first information including the same information, if the search unit has identified the first information that includes the same information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an example of embedding information that can be obtained as a result of decode processing.

FIGS. 8A, 8B, and 8C illustrate examples of updated embedding information.

FIGS. 10A, 10B, 10C, and 10D illustrate examples of embedding information to be transmitted from the MFP to the server.

FIG. 11 illustrates an example of a data table that can be generated by the server.

FIGS. 14A and 14B illustrate examples of a search information list that can be used by the server in the trace processing.

FIG. 16 illustrates terminology definition 1.
FIG. 17 illustrates terminology definition 2.
FIG. 18 illustrates terminology definition 3.
FIG. 19 illustrates terminology definition 4.
FIG. 20 illustrates terminology definition 5.

DESCRIPTION OF THE EMBODIMENTS

Various exemplary embodiments, features, and aspects of the invention will be described in detail below with reference to the drawings.

Figure 1:
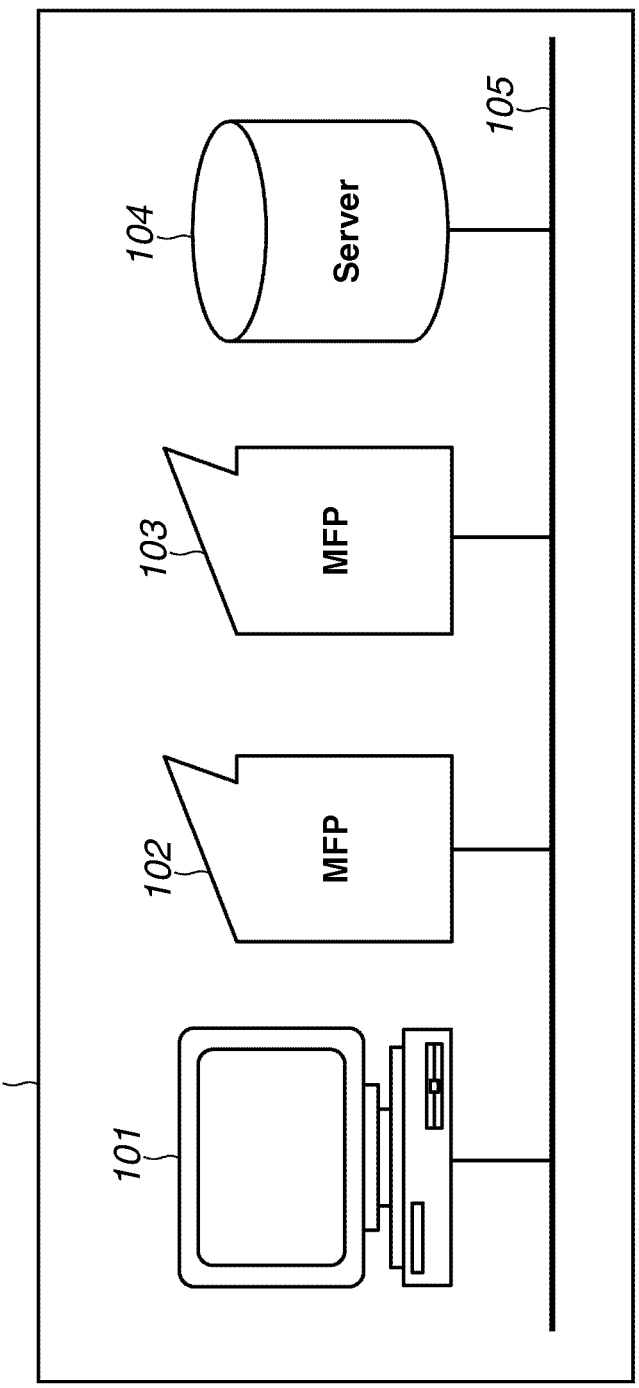
FIG. 1 illustrates an example configuration of a document management system according to an exemplary embodiment of the present invention.

An example system according to a first exemplary embodiment is described below. FIG. 1 illustrates an example configuration of a document management system 100 according to the present invention.

The document management system 100 includes a PC 101, an MFP 102, an MFP 103, and a server 104, which are connected to each other via a network 105 (e.g., a local area network (LAN)).

The PC 101 is an information processing apparatus, such as a personal computer, which includes a central processing unit (CPU), a random access memory (RAM), a read only memory (ROM), a hard disk, an external storage apparatus, a network interface, a display device, a keyboard, and a mouse.

The MFP 102/103 is a multifunction peripheral that is operable as an image forming apparatus having a scanner function, a copy function, a print function, and a send function. The image forming apparatus according to the present exemplary embodiment is not limited to the MFP and can be any type of apparatus that can form an image on a memory or on a paper.

Further, the number of the image forming apparatuses included in the document management system is not limited to two. For example, the document management system illustrated in FIG. 1 may include only one MFP or can include three or more MFPs.

The server 104 is an information processing apparatus that can store various files and data transmitted from the PC 101 and the MFP 102/103.

<Hardware Configuration>

Figure 2:
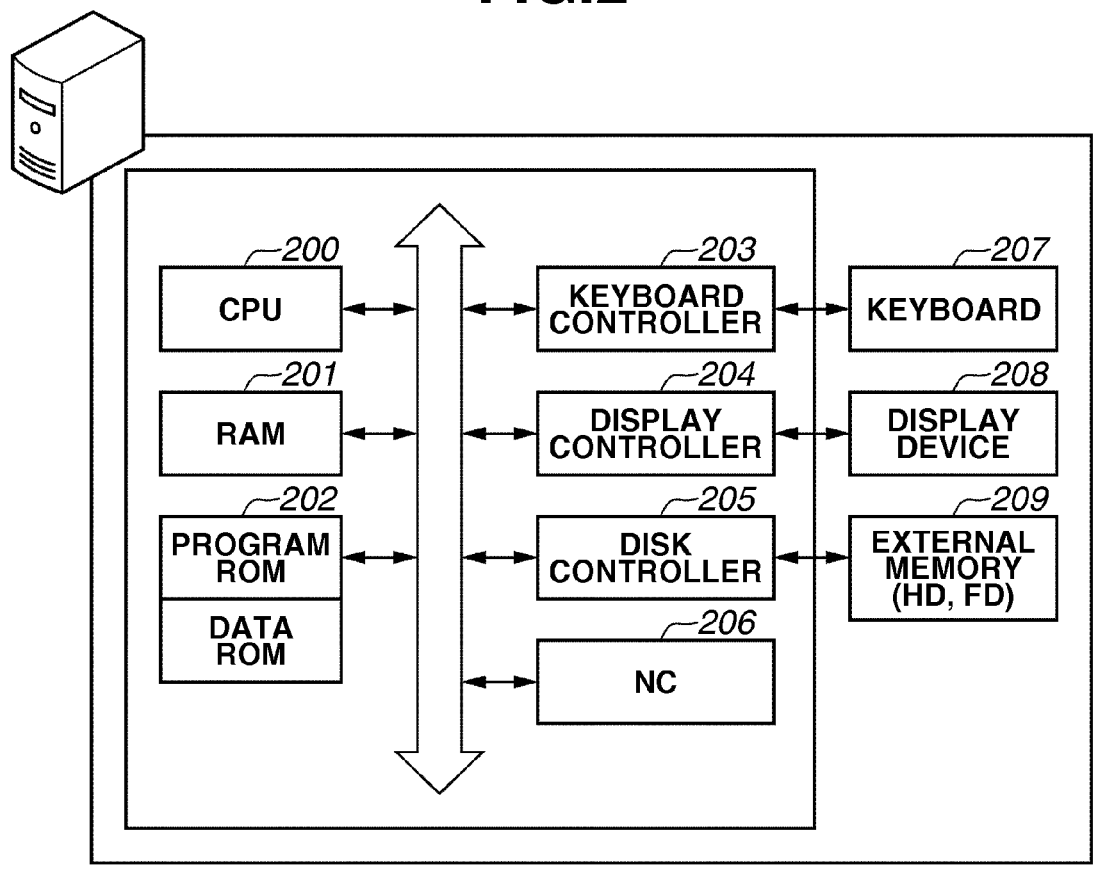
FIG. 2 illustrates an example of a hardware configuration of a PC or a server that constitutes the document management system according to an exemplary embodiment of the present invention.
Figure 3:
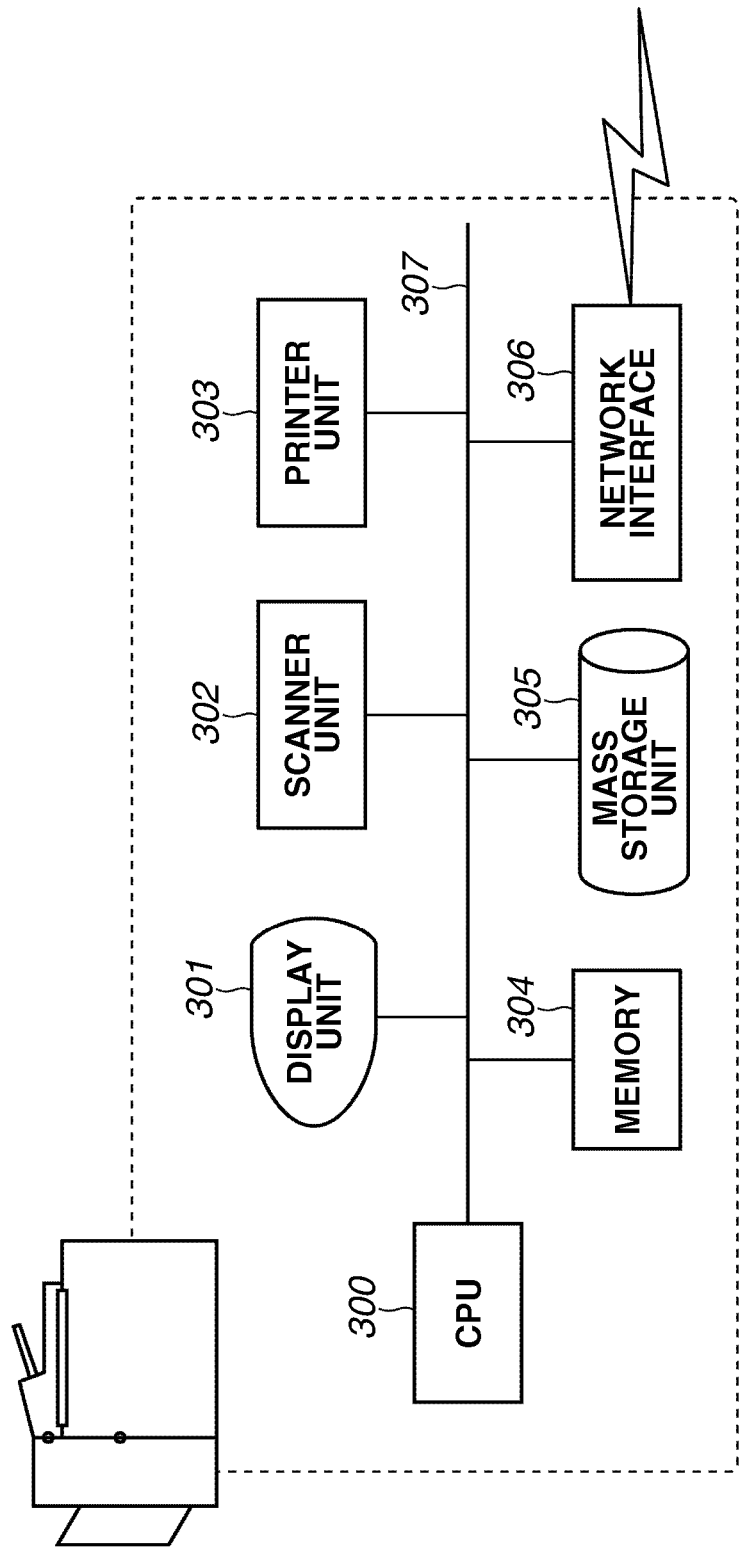
FIG. 3 illustrates an example of a hardware configuration of a multifunction peripheral (MFP) that constitutes the document management system according to an exemplary embodiment of the present invention.

FIG. 2 illustrates an example of a hardware configuration of the PC 101 and the server 105. FIG. 3 illustrates an example of a hardware configuration of the MFP 102/103.

In FIG. 2, a central processing unit (CPU) 200 can execute a program, such as an operating system (OS) or an application, which is stored in a program ROM of a read only memory (ROM) 202 or loaded into a random access memory (RAM) 201 from a hard disk 209. The RAM 201 is functionally operable as a main memory or a work area of the CPU 200.

A keyboard controller 203 can control key information input via a keyboard 207 or a pointing device (not illustrated). A display controller 204 can control a display operation of a display device 208.

A disk controller 205 can control data access to the hard disk (HD) 209 or a Floppy® disk (FD) that can store various data. A network controller (NC) 206 is connected to a network and can execute processing for controlling communications with external devices.

In FIG. 3, a central processing unit (CPU) 300 is a processor capable of controlling various operations to be performed by the MFP 102/103 and further controlling each unit connected via an internal bus 307. A display unit 301 is an image display device, such as a touch panel. The display unit 301 enables a user to instruct a copy operation while viewing a screen displayed thereon.

A scanner unit 302 is capable of scanning a document to acquire image data. A printer unit 303 is capable of printing an image on a recording medium (e.g., paper). A memory 304 stores various commands (including application programs) that the CPU 300 executes to control the MFP 102/103. A mass storage unit 305 temporarily stores the image data obtained by the scanner unit 302.

A network interface 306 can transmit and receive various data via the network 105 according to an instruction from the CPU 300.

<Software Configuration>

Figure 4:
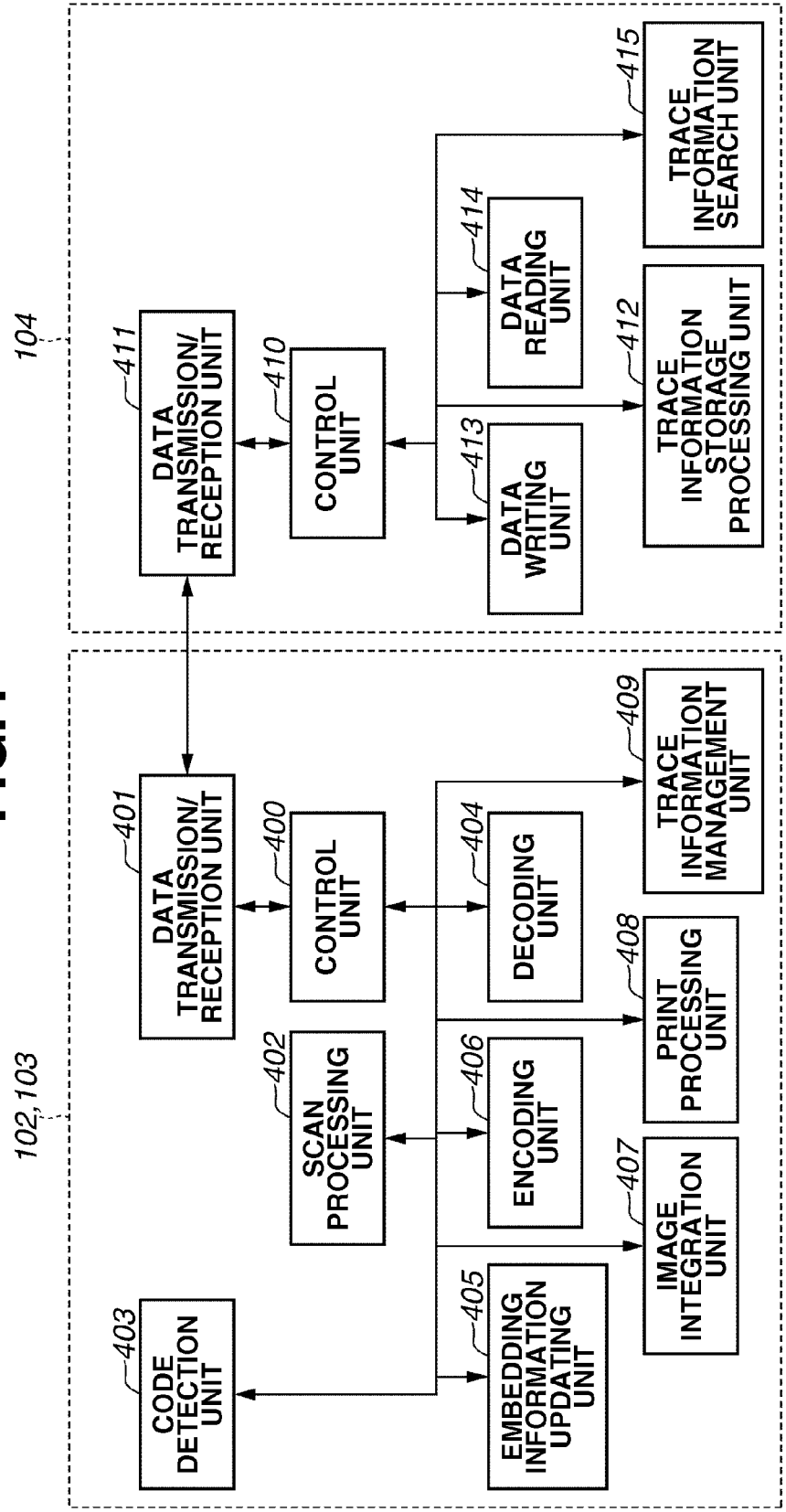
FIG. 4 illustrates an example of a software configuration of the document management system according to an exemplary embodiment of the present invention.

FIG. 4 illustrates an example of a software configuration of the document management system, which includes the MFP 102/103 (indicated by a dotted line) and the server 104 (indicated by a dotted line). To realize the software configuration illustrated in FIG. 4, the CPU of each apparatus executes a program stored in the storage apparatus (e.g., RAM, external memory, mass storage apparatus, or memory) of each apparatus.

First, the MFP 102/103 is described in detail below. A control unit 400 can control various operations to be performed by the MFP 102/103 and perform instruction and management processing for each unit provided in the MFP 102/103.

A data transmission/reception unit 401 can transmit and receive various data to and from the server 104. Further, the data transmission/reception unit 401 can transmit and receive various data to and from the PC 101, although not illustrated in FIG. 4.

A scan processing unit 402 causes the scanner unit 302 to scan a document positioned on the document positioning plate based on a user's operation instruction input via a user interface (UI). The scan processing unit 402 can acquire image data as a scanning result.

A code detection unit 403 can detect a QR code from the image data acquired by the scan processing unit 402. In the present exemplary embodiment, a coded image attached to a document is not limited to the QR code (i.e., a representative two-dimensional code). For example, the present invention can be applied to a document management or copy restriction technique capable of adding a coded image of specific information (e.g., one-dimensional code or electronic watermark) to a document.

Further, in the present exemplary embodiment, the "document" is a terminology that indicates a printed product or a copied product on which specific information (e.g., text and graphics) is printed. Further, in the present exemplary embodiment, the "content" is a terminology that indicates specific information including text and graphics on a printed product or a copied product. For example, a printed product "A" and a copied product "B" thereof have same content (i.e., text and graphics) although they can be discriminated from each other.

A decoding unit 404 can perform decoding processing to decode a detected QR code and extract embedding information from the QR code.

An embedding information updating unit 405 can update the embedding information and generate new embedding information to be added to a copy document. If there is not any target embedding information to be updated (for example, when no QR code is attached to a copy source document), the embedding information updating unit 405 newly generates embedding information.

An encoding unit 406 can perform encoding processing to encode the updated (or newly generated) embedding information and generate a QR code as a coded image.

An image integration unit 407 can perform integration processing to integrate image data of a printing target with the QR code generated by the encoding unit 406.

A print processing unit 408 can perform print processing. More specifically, the print processing unit 408 causes the printer unit 303 to form an image on a recording medium (e.g., a paper) based on the integrated image data obtained by the image integration unit 407.

A trace information management unit 409 can generate trace information, as information required to trace usage history of a printed product, based on the embedding information extracted by the decoding unit 404 and the new embedding information generated by the embedding information updating unit 405. Further, the trace information management unit 409 can store and manage the generated trace information.

Next, the server 104 is described in detail below. A control unit 410 can control various operations to be performed by the server 104 and can perform instruction and management processing for each unit provided in the server 104. A data transmission/reception unit 411 can transmit and receive data to and from the MFP 102/103. Further, the data transmission/ reception unit 411 can transmit and receive various data to and from the PC 101, although not illustrated in FIG. 4.

A trace information storage processing unit 412 can perform various processing to store the trace information received from the MFP 102/103 based on an instruction from the control unit 410. A data writing unit 413 can perform writing and storing processing to write various data other than the trace information in a hard disk (not illustrated) based on an instruction from the control unit 410.

A data reading unit 414 can read various data (including the trace information) from the hard disk based on an instruction from the control unit 410. A trace information search unit 415 can perform various processing required to trace search information received from the data transmission/reception unit 411 based on an instruction from the control unit 410.

<Description of a Document Including a Coded Image Attached Thereto>

Figure 5:
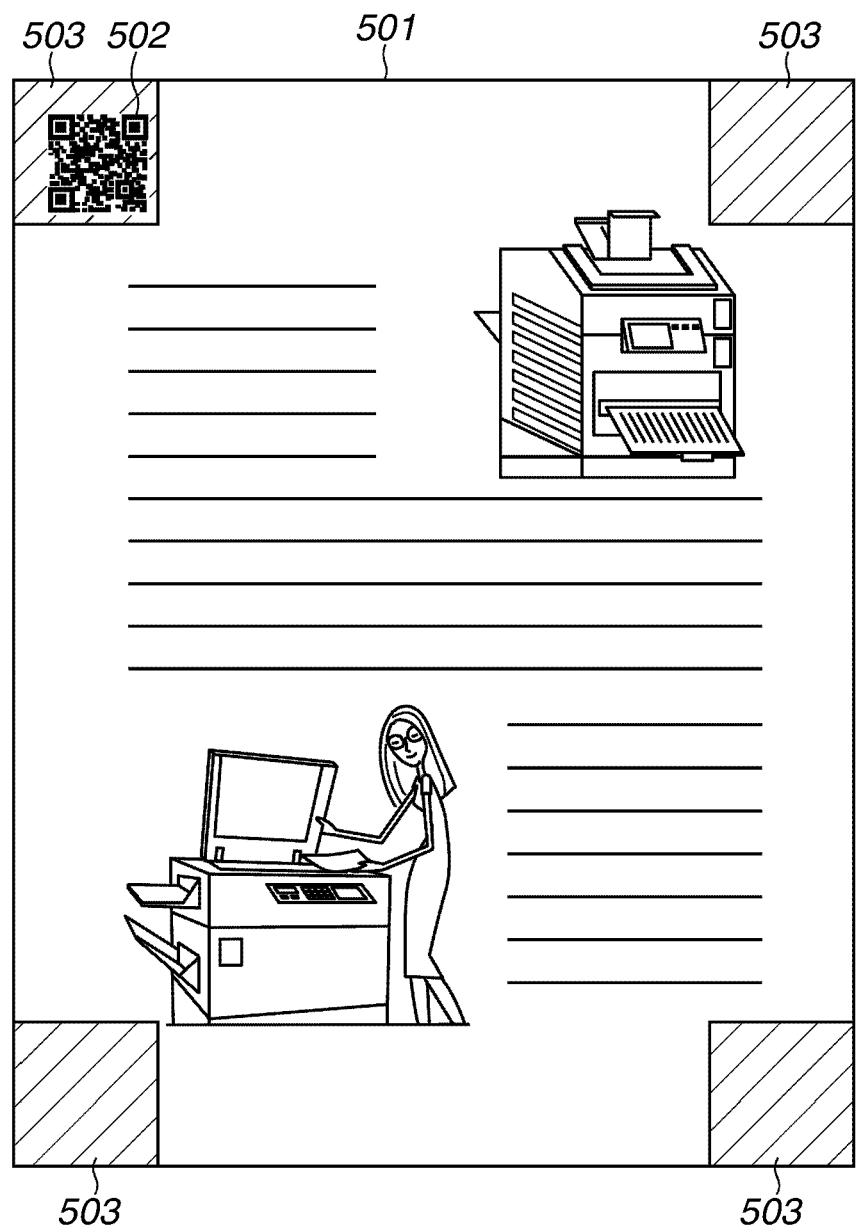
FIG. 5 illustrates an example of a document including coded images attached thereto.

FIG. 5 illustrates an example document 501 including coded images attached thereto, which serves as a scan target according to the present invention.

The document 501 includes a QR code 502 (i.e., a coded image obtained by encoding embedding information) printed in a predetermined area of a recording medium. More specifically, the QR code 502 is a code printed in any one of four rectangular areas 503 positioned at four (upper left, lower left, upper right, and lower right) corners of the document 501. In the present exemplary embodiment, the upper left rectangular area 503 is a target of QR code detection processing.

The length of one side of each rectangular area 503 is, for example, 30 mm in both the vertical and horizontal directions. It is needless to say that a QR code printable area is not limited to the above-described example. The position, the shape, and the size of each area can be arbitrarily set.

For example, the embedding information includes the following information.
1. Copy number of the document
2. Page number of the document
3. Latest user information (i.e., user information that identifies a user who has instructed outputting the latest document)
4. Original user information (i.e., user information that identifies a user who has first instructed outputting the content)
5. Latest date and time information that identifies date and time when the latest document has been output
6. Latest device information that identifies an MFP that has output the latest document
7. Original date and time information that identifies date and time when the document of the content has been first output
8. Original device information that identifies an MFP that has first output the document of the content The content of the embedding information is not limited to the above-described example. For example, the embedding information can include output type information (e.g., information indicating printing of image data transmitted from the PC or copying of a document positioned on the document positioning plate) additionally, if necessary.

In the present exemplary embodiment, the copy number is a serial number assigned to each output copy of the document in the print or copy processing. Further, the page number is a serial number assigned to each page of the document in the print or copy processing. For example, in a case where each page of a document composed of three pages is printed two times, a total of six printed products are output.

In this case, the following embedding information (i.e., copy number and page number) is written in respective printed products.
1. Printed product 1: copy number=1, and page number=1
2. Printed product 2: copy number=1, and page number=2
3. Printed product 3: copy number=1, and page number=3
4. Printed product 4: copy number=2, and page number=1
5. Printed product 5: copy number=2, and page number=2
6. Printed product 6: copy number=2, and page number=3

Accordingly, each printed product having been output in the same print or copy processing can be discriminated from each other in combination of the copy number and the page number. In a case where the printed product is a two-sided print product, the page number is printed on each of the front and back surfaces of a paper.

<Description of Processing that can be Performed by the MFP 102/103>

First, copy processing, as example processing that can be performed by the MFP 102/103, is described below.

Figure 6:
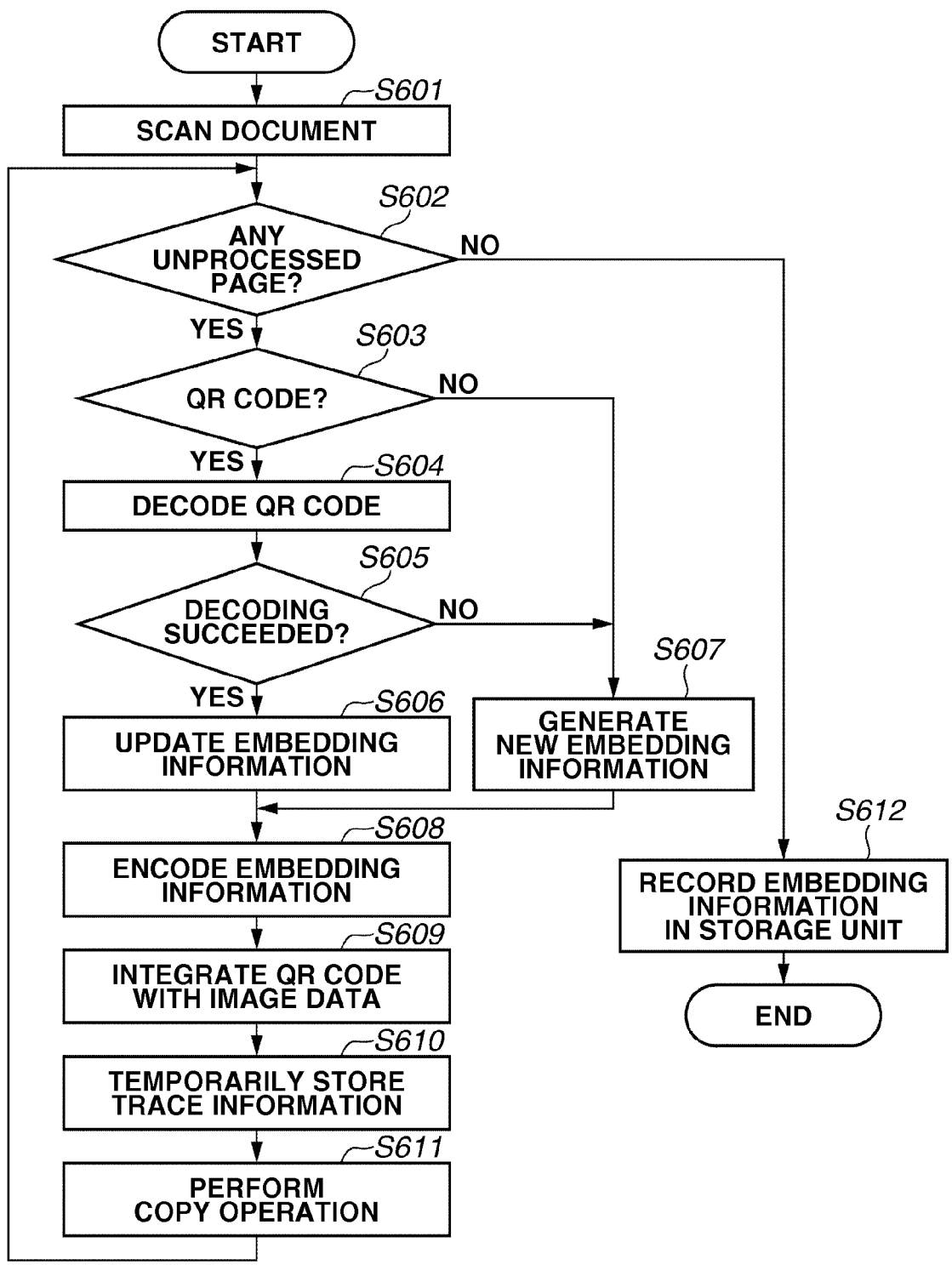
FIG. 6 is a flowchart illustrating an example procedure of copy processing that can be performed by the MFP according to an exemplary embodiment of the present invention.

FIG. 6 is a flowchart illustrating an example processing flow of copy processing that can be performed by the MFP 102/103. In the present exemplary embodiment, an application (i.e., a program) stored in a memory 304 launches in response to a user's operation instruction and the CPU 300 executes the launched application to realize processing of the following steps.

If a user sets a document to be copied on a document positioning plate of the MFP 102/103 and presses a copy instruction button (not illustrated), then in step S601, the scan processing unit 402 causes the scanner unit 302 to scan the document positioned on the document positioning plate of the MFP 102/103. Thus, the scanner unit 302 can acquire image data. In the following description, the scan target document is referred to as an "original document." For example, the original document itself can be a copied product (if a previously copied copy document is copied again).

In step S602, the MFP 102/103 determines whether there is any unprocessed page, for example, when the scanner unit 302 scans a plurality of pages (for example, supplied from the document positioning plate). If it is determined that at least one unprocessed page is present (YES in step S602), the processing proceeds to step S603. If it is determined that the processing is already completed for all pages (NO in step S602), the processing proceeds to step S612.

In step S603, the code detection unit 403 detects a QR code included in the acquired image data. More specifically, the code detection unit 403 checks the presence of any QR code in a target area (i.e., a rectangular area positioned at one of the above-described four corners) of the acquired image data. If the code detection unit 403 detects the QR code (YES in step S603), the processing proceeds to step S604.

In step S604, the decoding unit 404 decodes the detected QR code. More specifically, the decoding unit 404 decodes the QR code and extracts the embedding information.

FIG. 7 illustrates an example of the embedding information (hereinafter, referred to as "first information") having been extracted by the decoding unit 404.

The embedding information illustrated in FIG. 7 includes user information "Suzuki" indicating a user who has instructed printing of an original document, date and time information "2008/1/30 9:53:13" indicating the output date and time of the original document, copy number "1" of the original document, page number "2" of the original document, and device information "MPF-0001" of an MFP that has output the original document.

The embedding information illustrated in FIG. 7 further includes a "Latest user information" field. When the "Latest user information" field is blank, it means that the document is the first printed document of the content. Namely, the document is an original document that has not ever been copied. If the original document is a document having been copied by someone, user information indicating a user who has output the latest copy is described in the "Latest user information" field.

In step S605, the embedding information updating unit 405 determines whether the decoding of the detected QR code is successfully completed to extract the embedding information. If it is determined that the embedding information has been successfully extracted (YES in step S605), the processing proceeds to step S606. If it is determined that the decoding is failed due to a spoiled QR code (NO in step S605), the processing proceeds to step S607.

In step S606, the embedding information updating unit 405 updates the embedding information extracted in step S604 (i.e. the first information). More specifically, the embedding information updating unit 405 leaves the user information indicating the user who has generated the original document (i.e., the information obtained as the "Original user information") in the "Original user information" field and newly sets user information indicating the user who has instructed the present copy in the "Latest user information" field.

If the embedding information extracted in step S604 includes any "Latest user information", the latest user information is deleted because the user information indicating the user who has instructed the present copy is set in the "Latest user information" field.

Then, the embedding information updating unit 405 assigns date and time information of the present copy as well as copy number and page number of an output copy document (which can be obtained with reference to the number of copies and the number of pages), and updates the content of the embedding information.

FIG. 8A illustrates an example of the embedding information updated in step S606, namely the updated content of the embedding information illustrated in FIG. 7 (hereinafter, referred to as "second information").

According to the updated content of the embedding information illustrated in FIG. 8A, user information "Tanaka" who has performed the copy is described in the "Latest user information" field. The user information "Suzuki" indicating a user who has generated the original document is described in the "Original user information" field.

Further, the date and time of the copy performed by "Tanaka" is "2008/9/21 14:33:50." The copy number and the page number of the output copy document are "2" and "1", respectively. The device information is "MFP-0002."

As another method for updating the embedding information, it is useful to leave the "Original information" together with the "Latest information" if the "Original information" is included in the user information. More specifically, as illustrated in FIG. 8B, the embedding information at a time when the original document has been first output is described in the "Original" field, and information relating to the present copy is described in the "Latest" field.

On the other hand, if it is determined that the detection of the QR code is failed (NO in step S603) or if it is determined that the decoding of the QR code is failed (NO in step S605), then in step S607, the embedding information updating unit 405 generates new embedding information that is newly embedded into a document to be output in the copy processing.

FIG. 8C illustrates an example of the embedding information newly generated in step S607. The newly generated embedding information includes the user information "Tanaka" (i.e., the user who has instructed the copy processing this time) in the "Original user information" field, not in the "Latest user information" field.

In step S608, the encoding unit 406 encodes the embedding information updated in step S606 (i.e., the second information) or the embedding information newly generated in step S607 to generate a QR code.

In step S609, the image integration unit 407 integrates the generated QR code with the image data obtained in step S601. As a result, in a case where a QR code is attached to the original document, the MFP 102/103 generates a QR code containing updated embedding information. In a case where the original document does not include any QR code, the MFP 102/103 generates image data integrated with a newly generated QR code.

In step S610, in a case where it is determined that the QR code detection in step S603 is successful and the QR code decoding in step S605 is successful, the trace information management unit 409 generates trace information based on the embedding information extracted in step S604 (i.e., the first information) and the embedding information updated in step S606 (i.e., the second information). On the other hand, in a case where it is determined that the QR code detection in step S603 is failed or the QR code decoding in step S605 is failed, the trace information management unit 409 generates trace information based on the embedding information newly generated in step S607.

The generated trace information is temporarily stored in the mass storage unit 305 of the MFP 102/103. In this case, the storage location can be any other information storable location, such as the memory 304 of the MFP 102/103 or the hard disk of the server 104.

The trace information indicates information required to trace a page of a single printed product or a single copied product or to trace a document composed of a plurality of pages. The trace information includes page trace information and document trace information. A plurality of pieces of page trace information that are associated with each other constitutes a single piece of document trace information.

The page trace information includes page ID, input trace information, and output trace information. It is now assumed that the QR code is detected in step S603 and the decoding of the QR code is successfully completed.

As described in detail below, Latest information, copy number, and page number included in the embedding information of the original document extracted in step S604 (i.e., the first information) are collectively referred to as "input trace information" in the present exemplary embodiment.

1. Latest device information included in the embedding information of the original document extracted in step S604 (i.e., the first information) is referred to as "input device information."

2. Latest date and time information included in the embedding information of the original document extracted in step S604 (i.e., the first information) is referred to as "input date and time information."

3. Latest user information included in the embedding information of the original document extracted in step S604 (i.e., the first information) is referred to as "input user information."

4. Copy number included in the embedding information of the original document extracted in step S604 (i.e., the first information) is referred to as "input copy number."

5. Page number included in the embedding information of the original document extracted in step S604 (i.e., the first information) is referred to as "input page number."

As described in detail below, Latest information, copy number, and page number included in the embedding information updated in step S606 (i.e., the second information) are collectively referred to as "output trace information" in the present exemplary embodiment.

1. Latest device information included in the embedding information updated in step S606 (i.e., the second information) is referred to as "output device information."
2. Latest date and time information included in the embedding information updated in step S606 (i.e., the second information) is referred to as "output date and time information."
3. Latest user information included in the embedding information updated in step S606 (i.e., the second information) is referred to as "output user information."
4. Copy number included in the embedding information updated in step S606 (i.e., the second information) is referred to as "output copy number."
5. Page number included in the embedding information updated in step S606 (i.e., the second information) is referred to as "output page number."

If the QR code is not detected in step S603 or if the decoding of the QR is failed in step S605, Latest information, copy number, and page number included in the embedding information newly generated in step S607 are set as the "output trace information" and the "input trace information" is set as being null.

Both the input trace information and the output trace information are assigned to each page. In the present exemplary embodiment, a page ID identifying each page is newly issued to manage the input trace information and the output trace information. In the present exemplary embodiment, the page ID, the input trace information, and the output trace information are referred to as "page trace information."

Further, a document ID identifying each document is issued to manage the document composed of a plurality of pages. The document ID and the page trace information of each page are associated with each other and referred to as "document trace information." Example document ID issuance processing is described in step S612. FIGS. 10A to 10D illustrate examples of the trace information.

In step S611, the print processing unit 408 forms an image on a recording medium (e.g., a paper) based on the generated integrated image data and outputs the image formed on the recording medium, as a printed product. The printed-out copy document can be discharged from a discharge tray (not illustrated). When the print processing is completed, the processing returns to step S602. If there is any unprocessed page, the MFP 102/103 performs the above-described processing for the next page. If it is desired to prioritize the copy processing, the copy processing in step S611 can be executed prior to or in parallel with the trace information generation processing in step S610.

In step S612, the data transmission/reception unit 401 newly issues a document ID in association with the trace information of each page temporarily stored in step S610 and records the newly issued document ID in the mass storage unit 305. The recorded trace information can be later transmitted to the server 104 via the data transmission/reception unit 401 at predetermined timing (e.g., predetermined time interval or predetermined amount).

According to another method, the trace information can be transmitted to the server for every copy processing, if appropriate, instead of recording the trace information in the mass storage unit 305. Further, the server 104 or an external application (not illustrated) can access the MFP to acquire the trace information. An example of embedding information storage processing that can be performed by the server 104 is described in detail below.

Next, an example of print processing that can be performed based on image data received from the PC 101 is described below.

Figure 9:
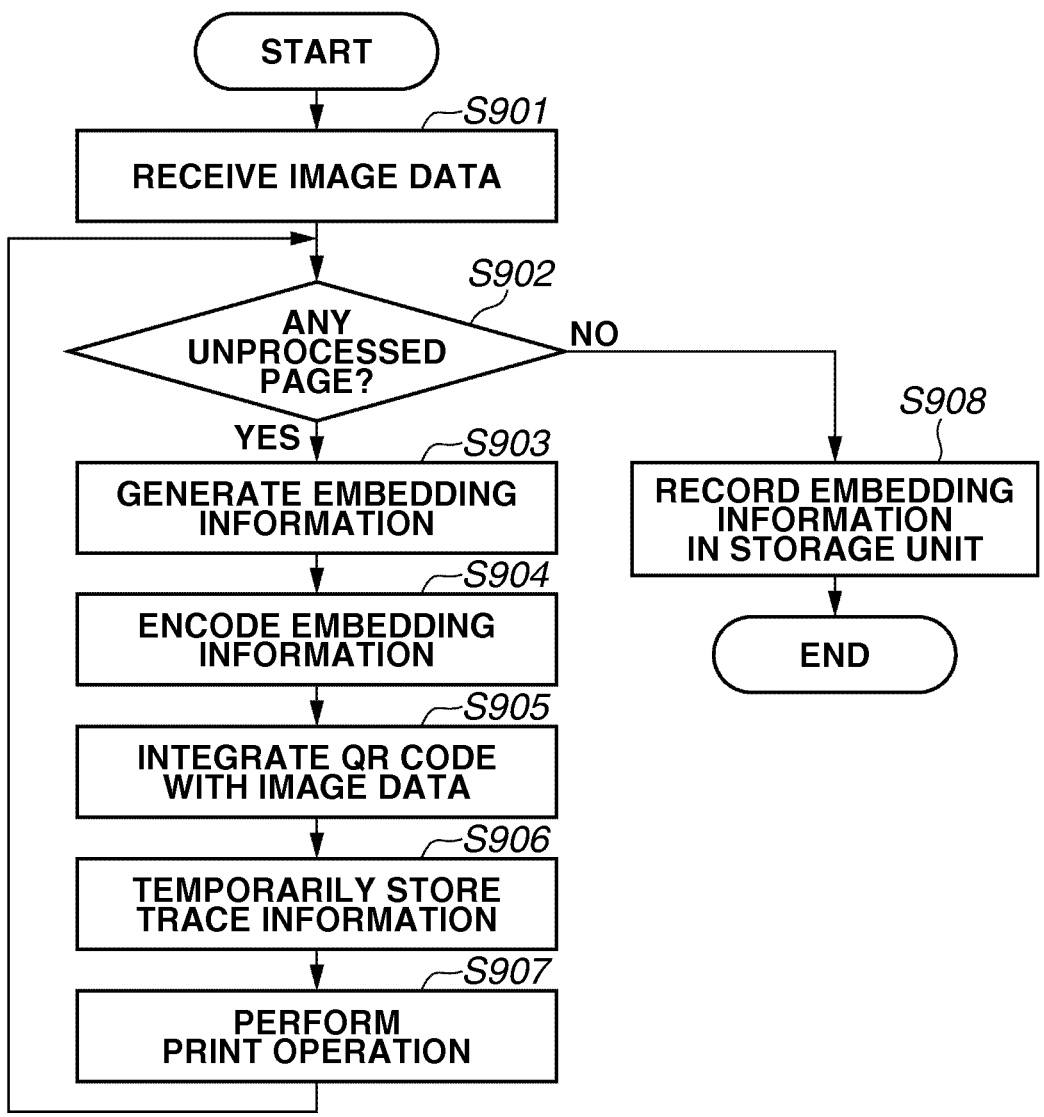
FIG. 9 is a flowchart illustrating an example procedure of print processing that can be performed by the MFP based on image data received from the PC according to an exemplary embodiment of the present invention.

FIG. 9 is a flowchart illustrating an example processing flow of the print processing that can be performed by the MFP 102/103 based on the image data received from the PC 101. Similar to the flowchart illustrated in FIG. 6, an application (i.e., a program) stored in the memory 304 is launched by a user operation and the CPU 300 executes the launched application to realize each of the following steps.

If a user instructs printing via the PC 101, then in step S901, the data transmission/reception unit 401 receives image data from the PC 101. In this case, it is assumed that the image data received by the data transmission/reception unit 401 is image data (bitmap data) having been already rasterized and suitable for printing.

If the received image data is PDL data, an image processing unit (not illustrated) executes image data modification processing (e.g., interpretation and rasterizing of the PDL data) to obtain image data suitable for the print processing in parallel with the following processing to be performed in step S903 and step S904.

In step S902, the MFP 102/103 determines whether there is any unprocessed page if the image data received from the PC 101 includes a plurality of pages. If it is determined that at least one unprocessed page is present (YES in step S902), the processing proceeds to step S903. If it is determined that the processing is already completed for all pages (NO in step S902), the processing proceeds to step S908.

In step S903, the embedding information updating unit 405 generates embedding information to be embedded in a document to be printed out. For example, the embedding information generated in step S903 includes user information of a user who has instructed the present print and date and time information of the presently printed document, as well as copy number and page number of the output document.

In step S904, the encoding unit 406 encodes the embedding information generated in step S902 to generate a QR code.

In step S905, the image integration unit 407 integrates the generated QR code with the image data (i.e., image data suitable for printing) received in step S901 to generate integrated image data including the QR code attached thereto.

In step S906, the trace information management unit 409 manages the trace information generated in step S903 and temporarily stores the trace information in the mass storage unit 305, similar to the processing in step S610. Practical examples of the trace information are described in detail below with reference to FIGS. 10A to 10D.

In step S907, the print processing unit 408 forms an image on a recording medium based on the generated integrated image data and outputs the formed image. The printed document can be discharged from the discharge tray (not illustrated). When the print processing is completed, the processing returns to step S902. If it is desired to prioritize the print processing, the print processing in step S907 can be executed prior to or in parallel with the trace information generation processing in step S906.

In step S908, the data transmission/reception unit 401 newly issues a document ID in association with the trace information of each page temporarily stored in step S906 and records the newly issued document ID in the mass storage unit 305. The recorded trace information can be later transmitted to the server 104 via the data transmission/reception unit 401 at predetermined timing (e.g., predetermined time interval or predetermined amount).

According to another method, the trace information can be transmitted to the server for every print processing, if appropriate, instead of recording the trace information in the mass storage unit 305. Further, the server 104 or an external application (not illustrated) can access the MFP to acquire the trace information instead of transmitting the trace information to the server 104 by the MFP.

Next, the trace information that can be generated by the MFP 102 or the MFP 103 in the copy processing or the print processing is described below.

FIGS. 10A to 10C illustrate examples of the trace information that can be generated by the MFP 102 or the MFP 103. The trace information illustrated in FIGS. 10A to 10C can be roughly classified into the "input trace information" and the "output trace information." In a case where the user's operation instruction is a copy instruction, the embedding information of the original document extracted in step S604 (i.e., the first information) is described in the "input trace information" field.

Accordingly, the "input trace information" field is blank if the user's operation instruction is a print instruction or when the detection of a QR code from the original document is failed or when the decoding of the detected QR code is failed even if the user's operation instruction is the copy instruction.

Further, the embedding information updated in step S606 (i.e., the second information) is described in the "output trace information" field if the user's operation instruction is the copy instruction and further the QR code detection from the original document and the decoding of the detected QR code have been successfully completed.

Further, if the QR code detection from the original document or the decoding of the detected QR code is failed even when the user's operation instruction is the copy instruction, the embedding information newly generated in step S607 is described in the "output trace information" field.

On the other hand, if the user's operation instruction is the print instruction, the embedding information generated in step S903 is described in the "output trace information" field.

The content of the trace information is not limited to the above-described example. For example, the trace information can include output type information (e.g., information indicating printing of transmitted image data or copying of a document positioned on the document positioning plate) additionally, if necessary.

The trace information is described in detail below with reference to examples illustrated in FIGS. 10A to 10C. First, FIG. 10A illustrates trace information generated based on the embedding information generated by the trace information management unit 409 in a case where a user having the user information "Suzuki" has instructed the "MFP-001", via the PC, to print the first copy of a document composed of two pages at the time "2008/1/30 9:53:13."

When a document is printed based on image data transmitted from the PC, the detection of the QR code is not performed. Therefore, the "input trace information" field is blank. The "output trace information" field includes "output user information", "output date and time information", "output copy number", "output page number", and "output device information", which correspond to "Original user information", "Original date and time information", "copy number", "page number", and "Original device information" of the embedding information illustrated in FIG. 7, respectively.

When the trace information search unit 415 actually performs the trace processing, the trace information search unit 415 identifies a document with reference to the "output date and time information" and the "output device information" and then identifies a page with reference to the "copy number" and the "page number."

Further, the trace information search unit 415 assigns a page ID "001" to the first page and assigns a page ID "002" to the second page. Further, the trace information search unit 415 assigns a document ID "100" to both of the first and second pages to associate these pages with each other. In general, the page ID and the document ID are expressed using unique information, such as UUID, although numerical values are used in the present exemplary embodiment.

The document ID and the page ID assigned to each page are mainly used to manage the trace information. In this respect, if any other method is available to manage the relevancy, it is unnecessary to use both the document ID and the page ID.

Further, in the present exemplary embodiment, the trace information storage processing unit 412 of the server 104 can reassign a new document ID and a new page ID after a document ID and a page ID are initially assigned to trace information generated by the MFP 102/103.

Further, when the trace information transmitted from the MFP 102/103 does not include any ID information (i.e., document ID and page ID), the trace information storage processing unit 412 of the server 104 can newly issue ID information when the trace information storage processing unit 412 stores the trace information.

FIG. 10B illustrates trace information generated at time "2008/9/21 14:33:50" when a use having a user name "Tanaka" has instructed the "MFP-002" to copy the document having been printed upon generation of the trace information illustrated in FIG. 10A. The trace information illustrated in FIG. 10B includes two page IDs "010" and "011" assigned to respective pages and one document ID "101" assigned to the copied document. Further, non-updated embedding information (i.e., embedding information of the original document) is described in the "input trace information" field.

In other words, the trace information illustrated in FIG. 10B indicates that the QR code has been successfully detected and decoded from the original document in the copying operation of the document. More specifically, the "input trace information" described in FIG. 10B is identical to the "output trace information" described in FIG. 10A.

Further, "output user information", "output date and time information", "output copy number", "output page number", and "output device information" of the "output trace information" field described in FIG. 10B correspond respectively to "Latest user information", "date and time information", "copy number", "page number", and "device information" of the embedding information described in FIG. 8A.

FIG. 10C illustrates trace information generated by the trace information management unit 409 when the user having the user name "Tanaka" has instructed the "MFP-003", via the PC, to print the second copy of the one-page document at the time "2010/1/10 13:45:34." As understood from FIG. 10C, a page ID "005" and a document ID "102" are assigned to the printed document. The extracted embedding information field is blank.

FIG. 10D illustrates trace information generated when a user having a user name "Yamada" has instructed the "MFP-003" to copy two documents (i.e., document "101" and document "102") as a single document at the time "2010/8/8 11:24:20." As understood from FIG. 10D, three page IDs "006", "007", and "008" and a single document ID "103" are assigned to the copied document.

The output trace information of the document "010" is described in the input trace information of the document "006." The output trace information of the document "011" is described in the input trace information of the document "007." Similarly, the output trace information of the document "005" is described in the input trace information of the document "008."

Hereinafter, it is assumed that the embedding information illustrated in FIGS. 10A to 10D is successively transmitted from the MFP 102 or the MFP 103.

<Storage Processing to be Performed by the Trace Information Storage Processing Unit 412 of the Server 104>

If the trace information storage processing unit 412 receives the above-described trace information, the trace information storage processing unit 412 stores the received information in the following manner.

FIG. 11 illustrates an example of a data table that can be generated by the trace information storage processing unit 412. It is understood that data 1 to 8 that correspond to the oldest trace information illustrated in FIG. 11A to the newest trace information illustrated in FIG. 11D are sequentially stored in the table.

The data table illustrated in FIG. 11 includes input user information 1103, input date and time information 1104, input copy number 1105, input page number 1106, input device number 1107, in addition to a document ID 1101 and a page ID 1102 of the output document. Further, the data table illustrated in FIG. 11 includes output user information 1108, output date and time information 1109, output copy number 1110, output page number 1111, and output device number 1112.

When significant values are stored in the input trace information fields 1103 to 1107, it means that the QR code has been successfully detected and decoded from the original document in the copy processing. Thus, the output trace information of the original document has been successfully identified. More specifically, no values are described in the input trace information field if the processing for detecting the QR code from the original document and decoding the detected QR code is failed even in the copy processing.

The server 104 can perform trace processing based on the trace information stored in the data table illustrated in FIG. 11, as described below.

<Description of Processing that can be Performed by the MFP 102/103>

Figure 12:
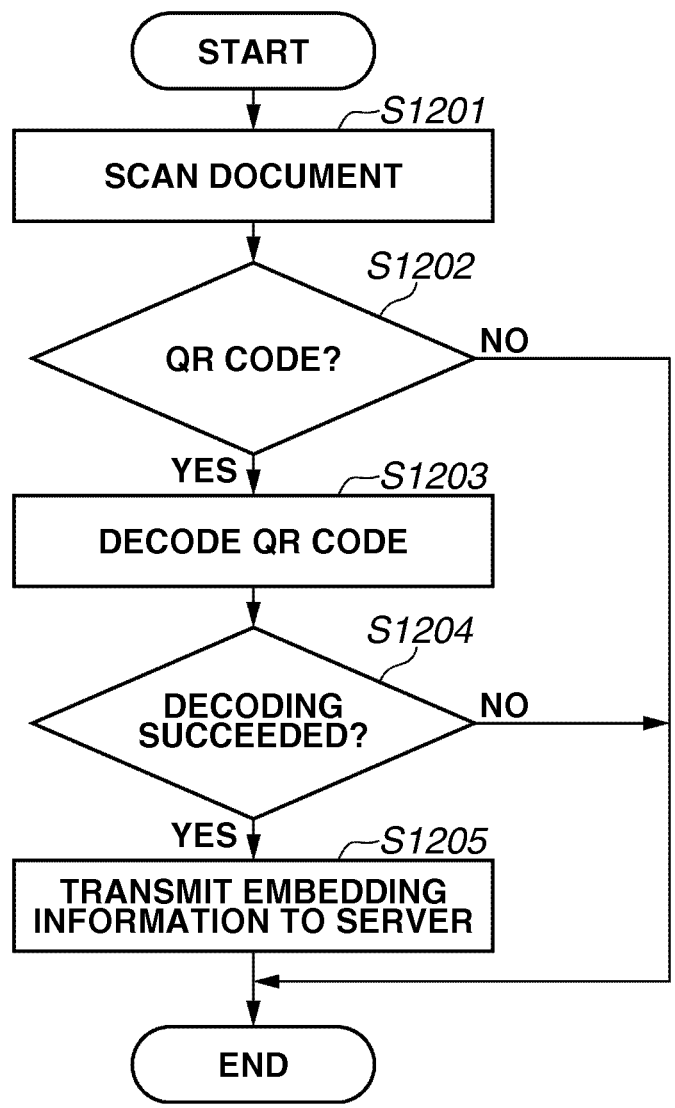
FIG. 12 is a flowchart illustrating an example processing flow of processing that can be performed by the MFP to transmit embedding information extracted from a trace target document to the server according to an exemplary embodiment of the present invention.

An example of the trace processing that can be performed by the MFP 102/103 is described below. FIG. 12 is a flowchart illustrating an example processing flow of processing that can be performed by the MFP 102/103 to transmit trace information scanned from a trace target document to the server 104. In the present exemplary embodiment, an application (i.e., a program) stored in the memory 304 launches in response to a user's operation instruction and the CPU 300 executes the launched application to realize processing of the following steps.

If a user sets a trace target document on the document positioning plate of the MFP 102/103 and presses a scan instruction button (not illustrated), then in step S1201, the scan processing unit 402 causes the scanner unit 302 to scan the document positioned on the document positioning plate of the MFP 102/103. Thus, the scanner unit 302 can acquire image data of the trace target.

In step S1202, the code detection unit 403 determines whether the acquired image data includes a QR code. If the QR code is detected (YES in step S1202), the processing proceeds to step S1203. If the QR code is not detected (NO in step S1202), the MFP 102/103 terminates the processing of the flowchart illustrated in FIG. 12. In step S1203, the decoding unit 404 decodes the detected QR code to extract embedding information.

In step S1204, the embedding information updating unit 405 determines whether the decoding of the QR code is successfully completed to extract the embedding information. If it is determined that the embedding information has been successfully extracted (YES in step S1204), the processing proceeds to step S1205. If it is determined that the decoding is failed due to a spoiled QR code (NO in step S1204), the MFP 102/103 terminates the processing of the flowchart illustrated in FIG. 12. In step S1205, the data transmission/reception unit 401 transmits the extracted embedding information to the server 104.

<Description of Processing that can be Performed by the Server 104>

Figure 13:
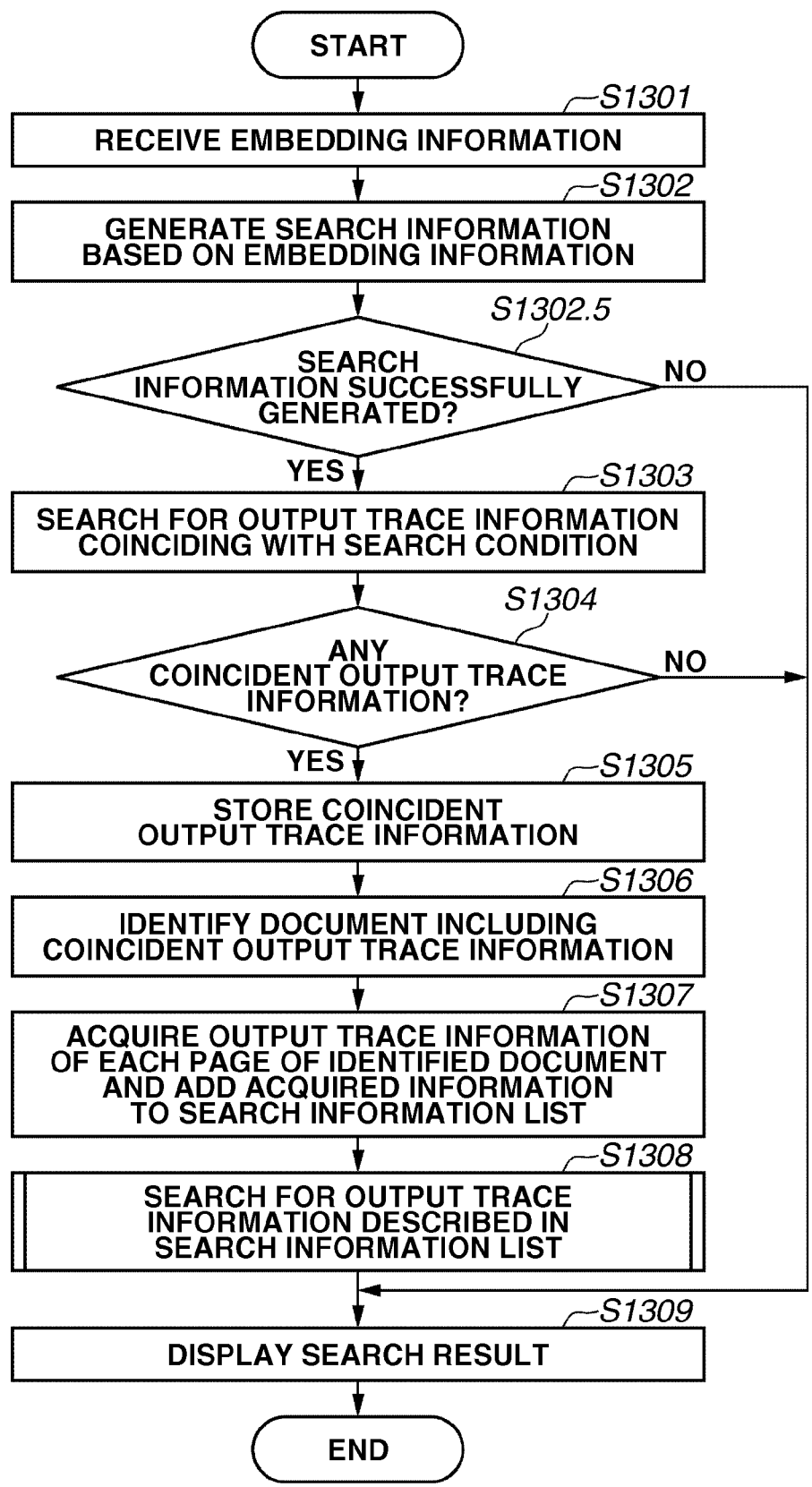
FIG. 13 is a flowchart illustrating an example processing flow of trace processing that can be performed by the server according to an exemplary embodiment of the present invention.

An example of the trace processing that can be performed by the server 104 is described below. FIG. 13 is a flowchart illustrating an example processing flow of trace processing that can be performed by the trace information search unit 415 of the server 104. The flowchart illustrated in FIG. 13 is described below with reference to FIG. 11 through FIGS. 14A and 14B. FIG. 14A illustrates an example of the search information list that can be generated by the server 104 in the trace processing. FIG. 14B illustrates a trace result list.

In step S1301, the data transmission/reception unit 411 receives embedding information from the MFP 102/103. In the present exemplary embodiment, it is assumed that the received embedding information is the information indicated in step S1205.

In the present exemplary embodiment, the embedding information is received from the MFP 102/103. However, it may be useful to receive embedding information from an external application (not illustrated) that can extract the embedding information from a QR code.

In step S1302, the trace information search unit 415 extracts "Latest device information", "Latest date and time information", "Latest user information", "copy number", and "page number" from the embedding information received in step S1301 and generates "search information" based on the extracted information.

For example, a document having the page ID "007" corresponding to the second page of the document ID "103" illustrated in FIG. 10 has the following search information.

1. Latest device information: "MFP-0003"
2. Latest date and time information: "2010/8/8 11:24:20"
3. Latest user information: "Yamada"
4. Copy number: "1"
5. Page number: "2"

In the present exemplary embodiment, the content of the "search information" is not limited to the above-described example. For example, the search information can include output type information (e.g., information indicating printing of transmitted image data or copying of a document positioned on the document positioning plate) additionally, if necessary.

In step S1302.5, the trace information search unit 415 determines whether the search information has been correctly generated. If it is determined that the search information has not been correctly generated (NO in step S1304), the processing proceeds to step S1309 to inform the failure of the trace.

In step S1303, the trace information search unit 415 searches the data table illustrated in FIG. 11 to find output trace information that coincides with the search information generated in step S1302.

In step S1304, the trace information search unit 415 determines whether there is any output trace information that coincides with the search information, as a result of the data table search performed in step S1303. If it is determined that the coincident output trace information is present (YES in step S1304), the trace information search unit 415 adds the acquired result to the search information list, the processing proceeds to step S1305.

According to the above-described example illustrated in FIG. 11, the trace information search unit 415 identifies the data 7 having a document ID "103" and a page ID "007" as coincident output trace information and adds the acquired result to the search information list.

More specifically, the "output trace information" corresponding to "007" is added to the "list 1" of the search information list illustrated in FIG. 14A. The content of the added information is as follows.

1. Output device information: "MFP-0003"
2. Output date and time information: "2010/8/8 11:24:20"
3. Output user information: "Yamada"
4. Output copy number: "1"
5. Output page number: "2"

In step S1305, the trace information search unit 415 stores the coincident output trace information. In the present exemplary embodiment, the numerical value "1" is set (described) in a "trace target" filed 1401 of the "list 1" illustrated in FIG. 14A. The trace target indicates the search information that corresponds to the embedding information obtained as the trace target in step S1301.

In step S1306, the trace information search unit 415 checks if the document having the coincident document ID includes any other page. According to the example illustrated in FIG. 11, it is determined that a page having a page ID "006" and a page having a page ID "008" are present in the document "103."

In step S1307, the trace information search unit 415 acquires output trace information of each page of the document identified in step S1306 and adds the acquired information to the search information list.

In the example illustrated in FIG. 11, three pages having the page IDs "006", "007" and "008" belong to the document "103." The page having the page ID "007" is already added in the search information list in step S1304. Therefore, in this step, the trace information search unit 415 adds the values of the output trace information fields 1404 to 1408 of the pages having the page IDs "006" and "008", as described in lists 2 and 3 illustrated in FIG. 14A.

As the pages having the page IDs "006" and "008" are not the search information that corresponds to the embedding information obtained as trace targets in step S1301. Therefore, the numerical value "0" is set in these trace target fields.

In step S1308, the trace information search unit 415 searches for each output trace information described in the search information list. FIG. 14B illustrates trace results 1409, 1410, and 1411 that have been obtained through the search processing, although the search processing is described in detail below with reference to a flowchart illustrated in FIG. 15.

The list 1 illustrated in FIG. 14B corresponds to the trace result of the list 1 illustrated in FIG. 14A. Similarly, the lists 2 and 3 illustrated in FIG. 14B correspond to the trace results of the lists 2 and 3 illustrated in FIG. 14A. The output trace information of each document is described in the "output trace information" field of each trace result. The processing is described in detail below with reference to the flowchart illustrated in FIG. 15.

In step S1309, the trace information search unit 415 causes the display device 208 to display the trace result via the display controller 204. Alternatively, the trace information search unit 415 transmits the trace result to the MFP 102/103 via the data transmission/reception unit 411 so that the trace result can be displayed on the display unit 301 of the MFP 102/103.

Figure 15:
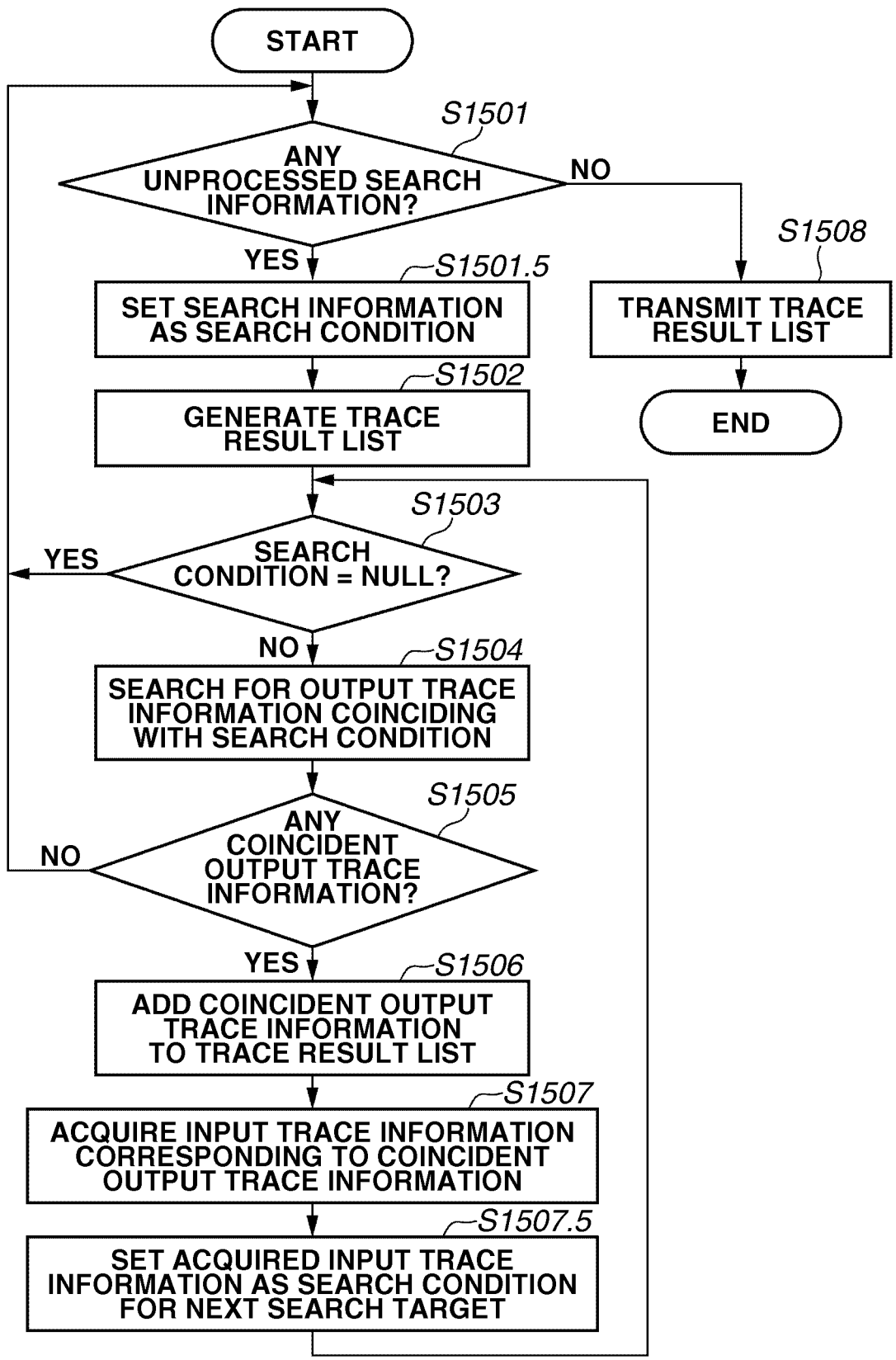
FIG. 15 is a flowchart illustrating an example processing flow of processing that can be performed by the server to search for output trace information described in the search information list according to an exemplary embodiment of the present invention.

FIG. 15 is a flowchart illustrating an example processing flow of search processing that can be performed by the trace information search unit 415 to search for the output trace information described in the search information list in step S1308. As described above, the search information list includes the information in the fields 1401 and 1404 to 1408 illustrated in FIG. 14A.

In step S1501, the trace information search unit 415 determines whether there is any unprocessed search information in the search information list. If it is determined that unprocessed search information is present in the search information list (YES in step S1501), the trace information search unit 415 acquires search information. Then, the processing proceeds to step S1501.5. If it is determined that there is not any unprocessed search information (NO in step S1501), the processing proceeds to step S1508. The processing is described below with reference to the example of the list 1 illustrated in FIG. 14A.

In step S1501.5, the trace information search unit 415 sets the search information acquired in step S1501 as a search condition. The "search condition" is output trace information required to search the data table illustrated in FIG. 11 and is information to be updated in step S1507.

According to the example of the list 1 illustrated in the FIG. 14A, the search condition is the output trace information of the list 1 as described below.

1. Latest device information: "MFP-0003"
2. Latest date and time information: "2010/8/8 11:24:20"
3. Latest user information: "Yamada"
4. Copy number: "1"
5. Page number: "2"

In step S1502, the trace information search unit 415 generates a trace result list dedicated to the search information to be processed. When a plurality of documents is obtained as a trace result of the search information, it is necessary to return the trace result as a list.

In step S1503, the trace information search unit 415 determines whether the search condition is null. If it is determined that the search condition is null (YES in step S1503), it means that the document is the Original document or the QR code has not been successfully detected or decoded. In this case, the processing returns to step S1501 to process the next search information. If it is determined that the search condition is not null (NO in step S1503), the processing proceeds to step S1504.

In step S1504, the trace information search unit 415 searches the data table illustrated in FIG. 11 to find output trace information that coincides with the search condition.

In step S1505, the trace information search unit 415 determines whether there is any output trace information that coincides with the search condition, as a result of the data table search performed in step S1504. If it is determined that coincident output trace information is present (YES in step S1505), the processing proceeds to step S1506. If there is not any coincident output trace information (NO in step S1505), the processing returns to step S1501 to process the next search information. According to the example of the list 1 illustrated in FIG. 14A, the "data 7" illustrated in FIG. 11 can be identified.

In step S1506, the trace information search unit 415 adds the coincident output trace information to the trace result list generated in step S1502. According to the example of the list 1 illustrated in FIG. 14A, the trace result 1 of the list 1 corresponds to the coincident output trace information.

In the present exemplary embodiment, the information to be added to the trace result list is not limited to the output trace information. For example, the data number of the data table illustrated in FIG. 11 can be added to the trace result list.

Further, in step S1507, the trace information search unit 415 acquires input trace information that corresponds to the output trace information identified in step S1505 from the data table.

According to the example of the list 1 illustrated in FIG. 14A, the input trace information corresponding to the identified output trace information can be identified in the following manner.

1. Input device information: "MFP-0002"
2. Input date and time information: "2008/9/21 14:33:50"
3. Input user information: "Tanaka"
4. Input copy number: "2"
5. Input page number: "2"

In step S1507.5, the trace information search unit 415 sets the input trace information as a search condition. Then, the processing returns to step S1503 to repeat the above-described processing. A practical example of the repetitively performed processing is described in detail below as an example processing flow of the processing illustrated in FIG. 13 through FIG. 15.

In step S1508, the trace information search unit 415 transmits the trace result list generated in step S1502 and including the information added in step S1506.

An example processing flow of the processing illustrated in FIG. 13 through FIG. 15 is described in detail below with reference to FIG. 11 through FIG. 14. Similar to the above-described example, it is assumed that the embedding information received in step S1301 corresponds to the document ID "103" and the page ID "007" illustrated in FIG. 11.

First, the trace information search unit 415 generates search information based on embedding information in step S1302, and searches the data table in step S1303. The "data 7" is identified as a result of the search. Thus, the following output trace information is added to the search information list in step S1304.

1. Trace target: "1"
2. Latest device information: "MFP-0003"
3. Latest date and time information: "2010/8/8 11:24:20"
4. Latest user information: "Yamada"
5. Copy number: "1"
6. Page number: "2"

From the data table illustrated in FIG. 11, it is understood that the document ID of the "data 7" is "103." Therefore, the trace information search unit 415 searches the data table to find the data having the document ID "103" in step S1306. The trace information search unit 415 determines that the document "103" includes the page having the page ID "006" and the page having the page ID "008" in step S1306. The trace information search unit 415 adds the output trace information of these pages "006" and "008" to the search information list to obtain the lists 1 to 3 illustrated in FIG. 14A in step S1307.

Next, an example processing flow that can be performed by the trace information search unit 415 in step S1308 to search the search information described in the search information list (i.e., the processing illustrated in FIG. 15) is described below.

The trace information search unit 415 sets the following search information described in the list 1 illustrated in FIG. 14A as a search condition in step S1501.5.

1. Latest device information: "MFP-0003"
2. Latest date and time information: "2010/8/8 11:24:20"
3. Latest user information: "Yamada"
4. Copy number: "1"
5. Page number: "2"

The trace information search unit 415 searches the data table illustrated in FIG. 11 to find output trace information that coincides with the search condition in step S1504. A sa result of the search, the trace information search unit 415 identifies the "data 7" in step S1505. The trace information search unit 415 adds the output trace information of the "data 7" to the trace result list (see step S1506). The added trace result is the trace result 1 "1409" of the list 1 illustrated in FIG. 14B. Further, the trace information search unit 415 acquires the input trace information of the "data 7" from the data table and sets the acquired information as a search condition to be used in the next search in step S1507.5.

The search condition having been set in this case in step S1503 is as follows.

1. Latest device information: "MFP-0002"
2. Latest date and time information: "2008/9/21 14:33:50"
3. Latest user information: "Tanaka"
4. Copy number: "2"
5. Page number: "2"

If the trace information search unit 415 searches the data table to find output trace information that coincides with the above-described search condition, the trace information search unit 415 identifies "data 4" in step S1505. Thus, the trace information search unit 415 adds the output trace information of the "data 4" to the trace result list in step S1506. The added trace result is the trace result 2 "1410" of the list 1 illustrated in FIG. 14B. Further, the trace information search unit 415 sets the input trace information of the "data 4" as a search condition for the next search in step S1507.5.

The search condition having been set in this case in step S1503 is as follows.

1. Latest device information: "MFP-0001"
2. Latest date and time information: "2008/1/30 9:53:13"
3. Latest user information: "Suzuki"
4. Copy number: "1"
5. Page number: "2"

If the trace information search unit 415 searches the data table to find output trace information that coincides with the above-described search condition, the trace information search unit 415 identifies "data 2" in step S1505. Thus, the trace information search unit 415 adds the output trace information of the "data 2" to the trace result list in step S1506. The added trace result is the trace result 3 "1411" of the list 1 illustrated in FIG. 14B. Further, the trace information search unit 415 sets the input trace information of the "data 2" as a search condition for the next search in step S1507.5.

The search condition having been set in this case in step S1503 is as follows.

1. Latest device information: null
2. Latest date and time information: null
3. Latest user information: null
4. Copy number: null
5. Page number: null The value of the output trace information is null. Therefore, the trace information search unit 415 terminates the search information trace processing in step S1503. The trace information search unit 415 processes the next search information, more specifically, the processing of the list 2 illustrated in FIG. 14B in step S1501.

As a search result of the output trace information of the page ID "008", the latest document has the page ID "005" of the document "102." There is not any information relating to the preceding document (see trace result 3). It means that the trace processing has been completed for only one generation because the page ID "005" of the document "102" is for the Original document or due to failure in acquiring the embedding information of the QR code.

FIG. 16 illustrates an example screen that can be displayed on the display device 208 when the trace information search unit 415 displays the trace result in step S1309. In the present exemplary embodiment, the display device of the trace result screen illustrated in FIG. 16 is not limited to the display device 208 of the server 104. For example, the trace result screen can be displayed on the display device 208 of the PC 101 or on the display unit 301 of the MFP 102/103.

The trace result screen illustrated in FIG. 16 has a tree structure to display a document including trace target image data that has been obtained through the scan processing performed in step S1201.

The uppermost layer of the tree structure indicates a document that includes the trace target image data itself, as a constituent element of the document. More specifically, according to the above-described example trace of the page ID "007", the document 103 corresponding to the trace result 1 illustrated in FIG. 14B is positioned as an uppermost-layer component.

In the present exemplary embodiment, the trace result screen displays the output trace information in addition to the document. However, the trace information can be separately displayed on another screen. Further, instead of displaying the trace information, it may be useful to add a document name. Further, in the present exemplary embodiment, it may be useful to display information relating to the trace target image data as part of the uppermost-layer component of the tree, although not illustrated.

Further, the trace result screen illustrated in FIG. 16 includes two documents corresponding to the trace results 2 and 3 illustrated in FIG. 14B, which are positioned beneath the uppermost layer. In the present exemplary embodiment, to display the order of the document trace results explicitly, each document having the newest output date and time information is positioned above other documents. Alternatively, it may be useful to employ a list display format to allocate a number to each document.

The trace result screen illustrated in FIG. 16 further includes the document "102" that includes another page "008" of the document "103" indicated by a dotted line that constitutes the tree, although the trace target image data "007" is not included. The dotted line indicates that the document "102" is a relevant document, although it is not the trace result directly obtained from the trace target image data having been scanned by a user.

The display method is not limited to the above-described example. For example, instead of using the dotted line that constitutes a part of the tree, a list of relevant documents can be displayed on another screen or a specific color can be used to discriminate the relevant document from the document including the trace target image data.

Further, the present invention can be realized by executing the following processing. More specifically, the processing includes supplying a software program capable of realizing the functions of the above-described exemplary embodiment to a system or an apparatus via a network or an appropriate storage medium. The processing further includes causing a computer (or a CPU or a micro-processing unit (MPU)) of the system or the apparatus to read and execute the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-054465 filed Mar. 11, 2011, which is hereby incorporated by reference herein in its entirety.

What is claimed is:
1. A system comprising:
a storing unit configured to store first information and second information in association with each other, wherein the first information includes information indicating an output apparatus that has output an image, information indicating an output time of the image having been output from the output apparatus, and information indicating a user who has instructed the output apparatus to output the image, and the second information includes information indicating an original output apparatus that has output a source image of the image, information indicating an output time of the source image having been output from the original output apparatus, and information indicating a user who has instructed the original output apparatus to output the source image;
an acquisition unit configured to acquire information indicating an output apparatus of an image and information indicating an output time of the image having been output from the output apparatus, from a coded image included in the image;
a search unit configured to search the storing unit to find first information including the acquired information indicating the output apparatus and the acquired information indicating the output time of the image having been output from the output apparatus; and
a display unit configured to display information indicating a user who has instructed an original output apparatus to output a source image of the image, of the second information stored in the storing unit in association with the found first information, if the search unit has found the first information including the acquired information indicating the output apparatus and the acquired information indicating the output time.

2. The system according to claim 1,
wherein the first information further includes information indicating a page number and a copy number in outputting the image,
wherein the second information further includes information indicating a page number and a copy number in outputting the source image,
wherein the coded image further includes information indicating a page number and a copy number in outputting the image including the coded image,
wherein the acquisition unit is configured to further acquire information indicating a page number and a copy number in outputting the image,
wherein the search unit is configured to search the storing unit to find first information including the acquired information indicating the page number and the copy number, the acquired information indicating the output apparatus and the acquired information indicating the output time, and
wherein the display unit is configured to display information indicating a user who has instructed an original output apparatus to output a source image of the image, of the second information stored in the storing unit in association with the first information including the acquired information indicating the output apparatus, the acquired information indicating the output time and the acquired information indicating the page number and the copy number.

3. The system according to claim 1, further comprising:
a scanning unit configured to scan a document to obtain an image, wherein the image including the coded image is the obtained image.

* * * * *